H. Disston — Saw Setting Apparatus.

No. 73879

PATENTED JAN 28 1868

Witnesses:
W. Lotham
D. R. H. Godwin

H. Disston
By his Atty
H. Howson

United States Patent Office.

HENRY DISSTON, OF PHILADELPHIA, PENNSYLVANIA.

*Letters Patent No. 73,879, dated January 28, 1868.*

IMPROVEMENT IN DEVICE FOR SETTING SAWS.

*The Schedule referred to in these Letters Patent and making part of the same.*

TO ALL WHOM IT MAY CONCERN:

Be it known that I, HENRY DISSTON, of Philadelphia, Pennsylvania, have invented certain Apparatus for Setting the Teeth of Saws; and I do hereby declare the following to be a full, clear, and exact description of the same.

My invention consists of certain apparatus, fully described hereafter, whereby the accurate setting of the teeth of circular saws may be facilitated.

In order to enable others skilled in the art to make and use my invention, I will now proceed to describe its construction and operation, reference being had to the accompanying drawing, which forms a part of this specification, and in which—

Figure 1:
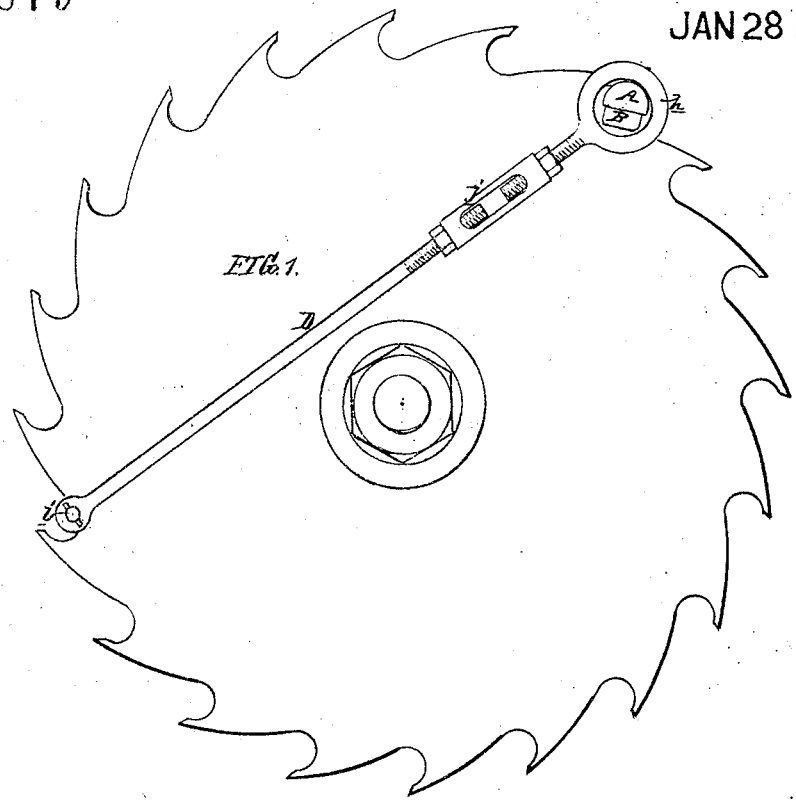
Figure 2:
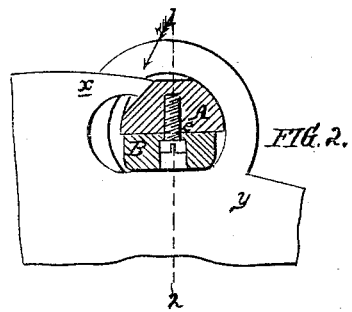
Figure 3:
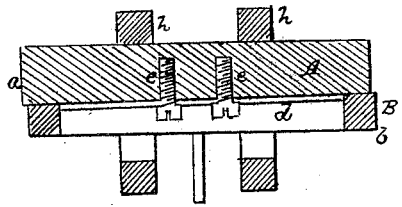
Figure 4:
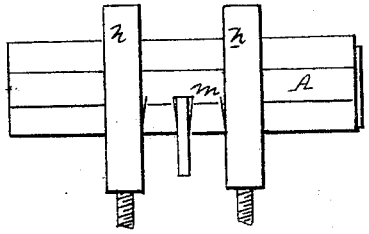

Figure 1 is a side view of my improved apparatus for setting the teeth of saws.
Figure 2, part of the same in section.
Figure 3, a section on the line 1 2, fig. 2; and
Figure 4 an exterior view of fig. 3.

Similar letters refer to similar parts throughout the several views.

A is a block of hard steel, having a gradual taper from its thickest end, $a$, to the opposite end, and to the under side of this block is fitted a plate, B, having a gradual taper from its thickest end, $b$, to the opposite end, the taper of the block and plate being such that the opposite surfaces of the double block remain parallel to one another, no matter what their relative position longitudinally may be.

The plate B has a longitudinal slot, $d$, for the reception of the heads of the set-screws $e$, the said heads bearing against a shoulder in the plate, and the stems screwing into the block A, as seen in figs. 2 and 3, so that, after loosening the screws, the relative positions of the block and plate longitudinally may be altered at pleasure, and secured, after adjustment, by tightening the screws.

The block A, viewed transversely, is semicircular, but is made flat on top throughout its entire length, and, to a limited extent, laterally, and one or more angular recesses are cut in the block in the inclined direction shown in fig. 2, the shape of the recess corresponding to that which it is desired to impart to the tooth.

In using this device, the block and plate are so adjusted longitudinally that the two combined can be inserted between the tooth $x$, to be set, and the back, $y$, of the adjacent tooth, as seen in fig. 2, the point of the tooth $x$ entering one of the angular recesses, after which it is struck repeatedly by a hammer, moving in the direction indicated by the arrow, until the tooth is expanded to the width and shape of the recess.

In order to retain the block in its proper position during the operation of hammering the tooth, I use two rods, D D, one on each side of the saw, each rod having at one end an eye, $h$, for receiving the block and plate, and the rods being connected together, at the opposite ends, by a pin, $i$, which fits into the space between two teeth at a point on the circumference of the saw nearly opposite to the tooth operated on.

Each rod being provided with a screw-coupling, $j$, may be lengthened or shortened at pleasure.

There may be several angular recesses, $m$, in the block, of different forms and dimensions, so that the apparatus may be used for operating on teeth of different shapes.

I claim as my invention, and desire to secure by Letters Patent—

1. The tapering block A, with one or more angular recesses, in combination with the tapering plate B, the block and plate being adjustable longitudinally, and being otherwise constructed substantially in the manner and for the purpose herein set forth.

2. The combination of the said block and plate with the adjustable rods D D, for the purpose specified.

In testimony whereof, I have signed my name to this specification in the presence of two subscribing witnesses.

HENRY DISSTON.

Witnesses:
A. H. SHOEMAKER,
WM. M. BILLMEYER.